Jan. 19, 1965
R. W. WEYMOUTH
3,166,039
WATER CRAFT
Filed Feb. 28, 1963
4 Sheets-Sheet 2
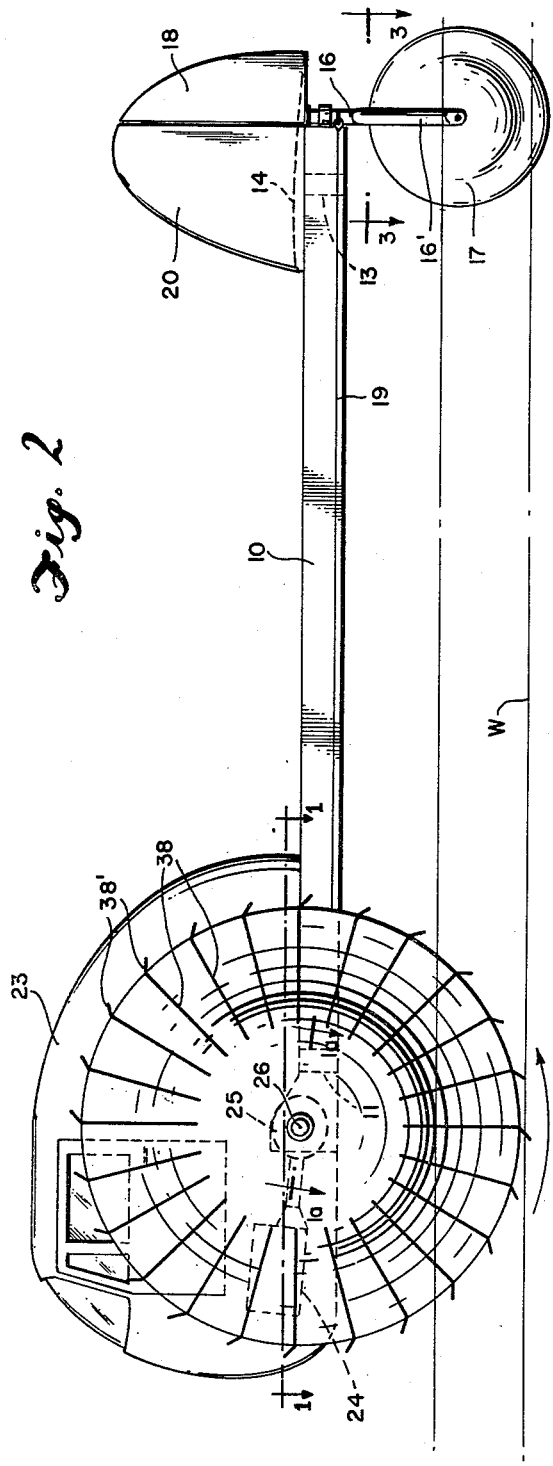
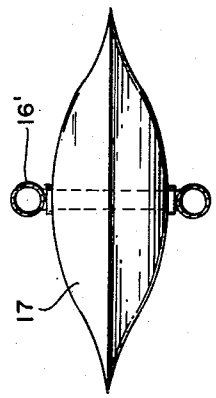
RALPH W. WEYMOUTH
INVENTOR.
BY
*ATTORNEYS*

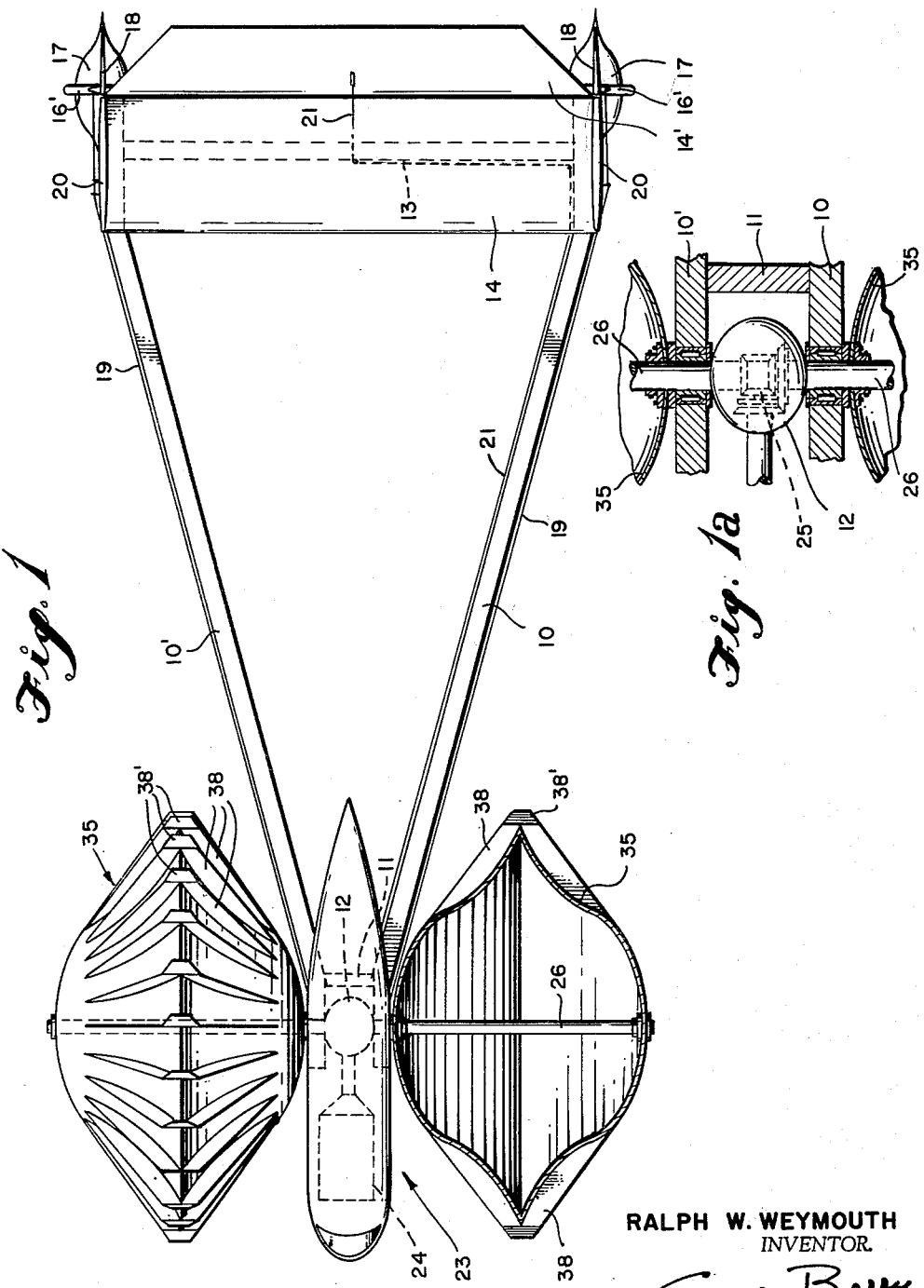

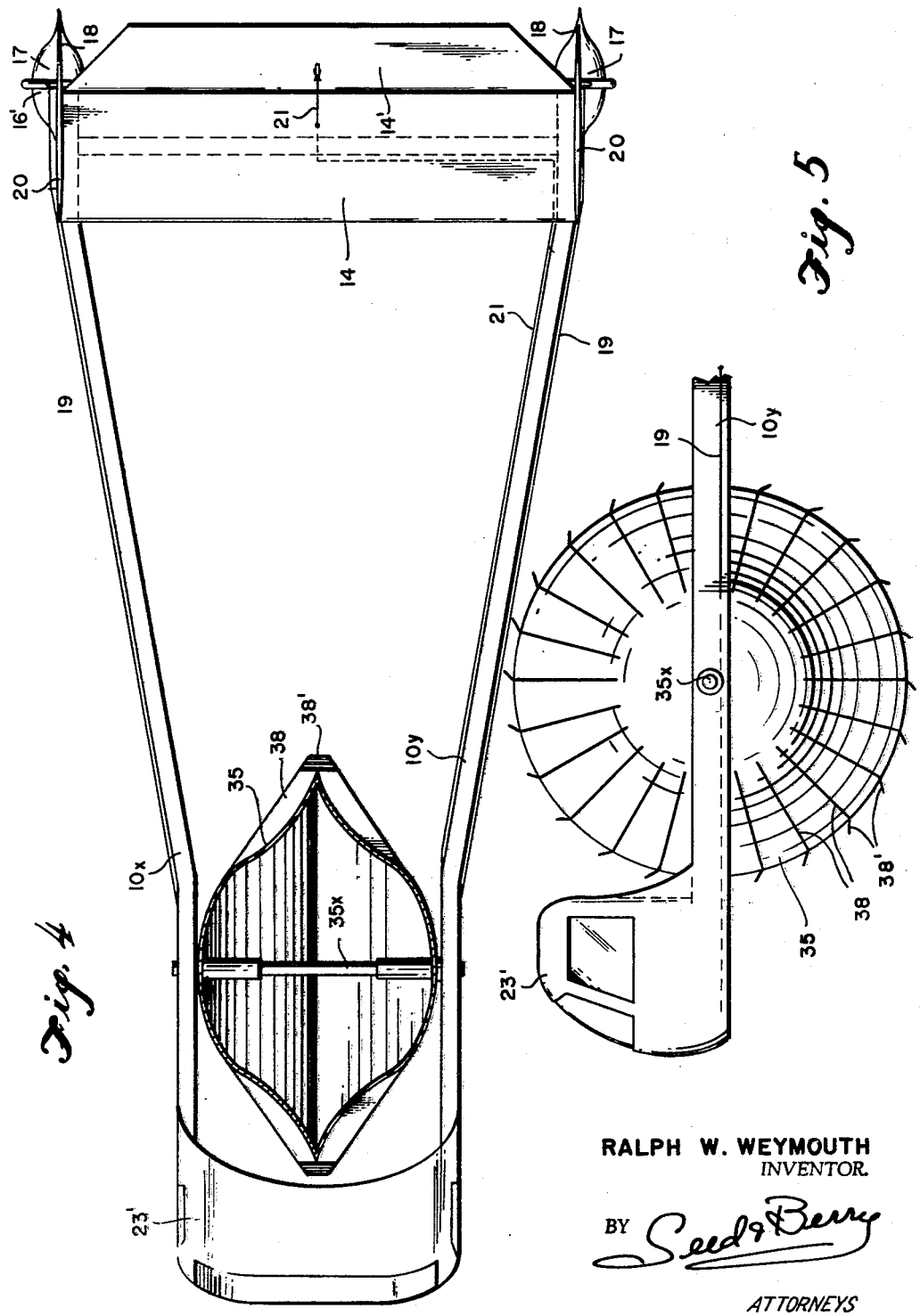

Jan. 19, 1965   R. W. WEYMOUTH   3,166,039
WATER CRAFT

Filed Feb. 28, 1963   4 Sheets-Sheet 4

RALPH W. WEYMOUTH
INVENTOR.

BY Seed & Berry

ATTORNEYS

United States Patent Office 3,166,039
Patented Jan. 19, 1965

3,166,039
WATER CRAFT
Ralph W. Weymouth, Box 160, Star Rte. 1,
Grapeview, Wash.
Filed Feb. 28, 1963, Ser. No. 261,651
5 Claims. (Cl. 115—1)

This invention relates to improvements in amphibious craft and more particularly, to novel types of powered craft designed for transportation of cargo and/or passengers and for various other uses, both on bodies of water and on land.

It is the principal object of this invention to provide a transportation vehicle of novel construction, that is supported for propulsion and travel on the surface of a body of water by buoyant pontoons, one or more of which are powered for effecting their rotation and the incident travel of the vehicle and which pontoons, incident to their propelling rotation, will rise in the water in accordance with the speed of their rotation and will thereby reduce their draft and resistance to travel in the water.

A further object of this invention is to provide transportation vessels of the above stated character, each with a cargo or passenger carrying frame structure that is equipped at its forward end with one or two of the above mentioned powered supporting and propelling pontoons and which, at its trailing end, is supported by an arrangement of manually controlled buoyant rudders that function with the increase in speed of travel of the craft on the water surface, to lift that end of the craft from the water in accordance with the speed of travel.

Other objects and advantages of the invention reside in the provision of a novel arrangement of water engaging fins on the powered propulsion pontoons to augment their propelling effect and also for increasing the lifting effect of the water on the pontoons in accordance with their speed of rotation.

Still further objects and advantages of the invention are to be found in the novel details of construction, relationship and combination of the various parts of the craft, particularly in its propelling, steering and buoyant supporting means and in the particular mode of operation of the craft that render it operative on land, as will hereinafter be described.

In accomplishing the above mentioned and other objects of the invention, I have provided the improved details of construction, the preferred forms of which are illustrated in the accompanying drawings, wherein—

FIG. 1 is a plan or top view of a water craft embodied by the present invention; one of its propelling and supporting pontoons being shown in horizontal section on line 1—1 in FIG. 2 for explanatory purposes.

FIG. 1a is a sectional detail taken on line 1a—1a in FIG. 2.

FIG. 2 is a side view of the craft, as normally resting idle in the water and particularly showing the relationship of its front end propulsion means and rear end steering equipment.

FIG. 3 is an enlarged horizontal section taken on line 3—3 in FIG. 2, showing the character of the rear end rudder form of buoyant supports.

FIG. 4 is a top or plan view of an alternative form of water vehicle embodied by this invention, as equipped with a single supporting and propulsion pontoon at its forward end; this pontoon being shown substantially in horizontal axial section for explanatory purposes.

FIG. 5 is a side view of the forward end portion of the craft shown in FIG. 4.

Referring more in detail to the drawings:

The water craft of the present character may be subjected to various modifications and changes, both in design and in size, as well as in proportionate dimensions, in accordance with the particular uses to which they are to be put. In the present drawings, I have illustrated one design of amphibious craft as having dual propulsion and supporting pontoons of substantial dimensions at its forward end and in another design have shown the craft as having a single propulsion pontoon of hollow formation which is adapted for enclosing the pontoon driving engine or prime mover therein. However, in each of these designs, the same basic principles of support, propulsion and steering are employed and each is subject to modification that may be required or desired to meet its specific use.

The craft illustrated in FIGS. 1 and 2, is shown as having a substantially horizontally disposed frame structure, including laterally spaced rearwardly diverging, longitudinally extending opposite side beams 10 and 10' which near their forward ends, are rigidly joined in a predetermined lateral spacing by a truss or bar member 11, as seen best in FIG. 1a. At their rearward ends, these beams are rigidly joined and spaced by a transverse truss structure 13. It is also to be observed that, at their rearward ends, the side beams 10–10', have terminal portions in parallel relationship and on those parallel portions, the opposite ends of an elevator 14 are fixedly secured. Across its rear edge the elevator 14 is equipped with a conventional form of aileron.

Figure 6:
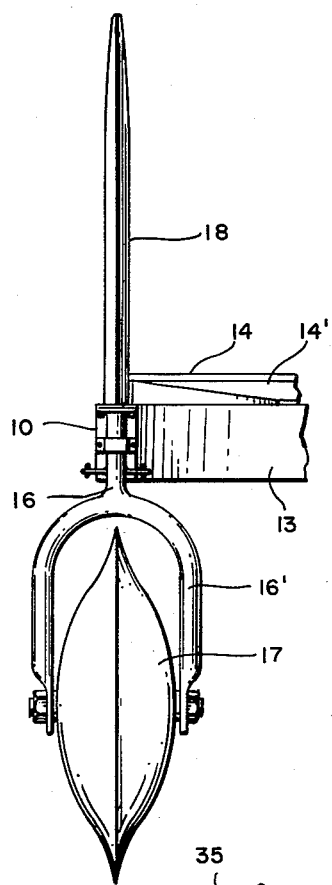
FIG. 6 is an enlarged elevational view of one of the rear and water and air rudder assemblies used in the present craft.
Figure 7:
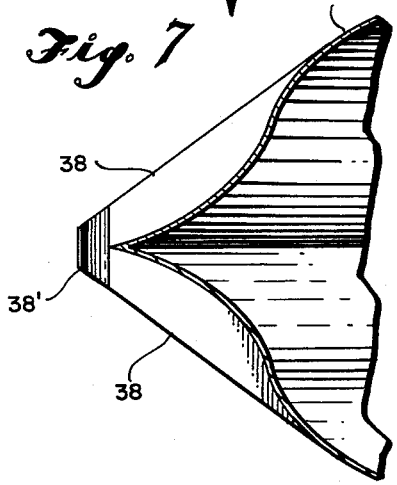
FIG. 7 is an enlarged section detail of a peripheral portion of one form of propulsion pontoon that may be employed in the present water craft of FIGS. 1 and 4.
Figure 8:
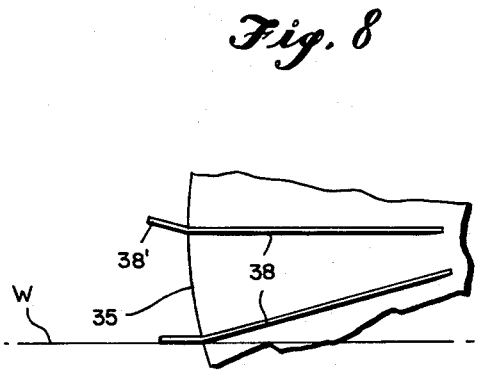
FIG. 8 is a side view of that portion of the propulsion pontoon shown in FIG. 7.

At their rear ends, each of the side beams 10–10' rotatably mounts a vertically extended rudder post 16 with a bifurcated lower end portion 16' which rotatably mounts a buoyant rudder 17 of wheel-like form therein. These rudders 17 as best shown in FIGS. 2 and 6, serve normally to support that end of the frame structure above the water surface as has been indicated in FIGS. 2 and 6, or to roll on the ground if the craft is used on land.

The upper end portions of the posts 16 extend to substantial height above the frame beams and each mounts an air rudder 18 in the same vertical plane of the corresponding wheel rudder 17. The posts 17 which mount the rudders 17 and 18 at opposite sides of the frame are each equipped with conventional steering cables 19—19, see FIG. 1, that are extended forwardly along the beam structures 10–10' to conventional or any suitable operating means in the operators cabin, presently identified. Also, cooperating stabilizers 20 are rigidly fixed to the opposite side beams 10–10' directly forwardly of and in alignment with the rudders 18.

It is anticipated that the parts 17 and 18, as above described, shall act in unison and all in conjunction under the pilots control, from a point in the operators cabin.

It is further to be explained that the elevator 14' is controlled by suitable cables connections 21 leading therefrom to the crafts cabin, along beam 10, designated by numeral 23. The cabin 23 preferably is supported rigidly by and upon the forward end portions of the laterally spaced frame beams 10–10', as shown in FIGS. 1 and 2. Immediately below or within the cabin 23, but forwardly of the housing 12, is a compartment in which the vehicles driving engine 24 is suitably supported.

This engine has a geared driving connection, designated generally at 25 in FIG. 1a, with a cross-shaft 26 that is rotatably contained axially of the gear case or housing 12 and extends at its ends to opposite sides of the main frame structure, and mounts the paired supporting and propulsion pontoons 35—35, the design of which is one of the characterizing features of this invention. This geared connection may be a differential connection for the pontoons or a direct drive for turning the wheels in unison, as may be desired.

As shown in FIG. 1, the two pontoons 35—35 are alike in size, weight and all other respects and are axially fixed, respectively, on the opposite end portions of the drive shaft 26 for driving thereby. Each pontoon is formed by the assembling and joining together of two circular dished discs of the same size, placed edge to edge and united about their peripheries in water and air tight joints, as has been indicated in the sectioning showing of the pontoon 35 at the lower side of the view in FIG. 1.

Applied to the outside surfaces of the opposite faces of each pontoon 35, radially thereof, as well shown, in FIG. 2, at predetermined satisfactory angularly spaced intervals are fins 38. Fins on opposite faces of each wheel are in transverse alignment, and corresponding fins at opposite faces are joined at their outer ends by slightly projecting paddle-like portions 38' that extend directly across the peripheral edge of the wheel. These paddle-like portions 38' are angularly inclined opposite to the direction of rotation of the pontoon and thus will flatly engage the water surface in their downward or water entering travel, with wheel lifting and forward propelling effect on the water, but with negligible drag on their water-leaving or upward travel.

It is to be understood that the dimensions of the wheels 35 may be altered to meet requirements of the particular craft using them. It is presently anticipated that the pontoons 35 of small craft for use in inland waters might have a diameter of from 10 to 12 feet and the dishing of the discs forming a pontoon would be as required to give it the necessary buoyancy.

The same can be said of the buoyant steering or rudder like wheels 17 that support the rear end of the craft. The present showing of relative proportional sizes of parts is not intended in any way to be a limitation.

Furthermore, it is to be understood that the dimension of fins 38, their lengths and angular spacing may be varied to best suit the craft or conditions of use. The buoyancy of the pontoons 35 and rudders 17—17 would be so determined as to keep the craft on an even keel when resting idle on the water under normal load.

At high speeds of rotation, these paired pontoons 35 will lift themselves in the water approximately to that normal surface level as has been indicated in FIG. 2 by their relationship to water line W.

The trailing end of the craft in travel, likewise, may be lifted by the proper adjustment of aileron 14' to lift the buoyant rudders 17—17 out of the water to avoid drag, and employ the air rudders 18 which are operable from the cabin 23, for steering the direction of the craft.

The modified form of craft shown by FIGS. 4 and 5 is substantially like that of FIG. 1 except in its employment of a single supporting and propelling pontoon 35 at its forward end and located between the extended forward end portions of the laterally spaced opposite side beams 10–10'. The rear end structure of this craft remains substantially substantially as previously described and in FIG. 4, the like parts as employed herein have been given the same reference numerals. This view, however, shows the pilots cabin 23' as being supported by the forwardly extended end portions of the opposite side beams of the frame structure.

In FIG. 4 I have shown the buoyant propulsion pontoon 35 to be rotatably mounted by an axle 35x with opposite ends revolvable in the spaced beams 10–10'. It is anticipated that in this arrangement, the propelling engine could be suitably mounted by the non-rotatable axle 35x with a driving connection with the wheel hubs 36, or it could be located outside the wheel and operatively connected in any one of various ways for its propelling.

Aside from the above described features of support and propulsion, it is desired to point out that the three point triangular support afforded particularly in the craft of FIG. 4, and to a somewhat lesser extent by the disposition of the pontoons 35—35 in their close relationship in the craft of FIG. 1, avoid the destructive wracking of a vessel having four points of support. The two pontoons 35—35 as used in FIG. 1 should be placed as close together as practical.

To better adapt this craft for land travel, the pontoons 35 and rudders 17—17 may be modified as may be found necessary to meet requirements. Likewise, the dimensions of parts of the frame structure may be modified to suit conditions of use.

In summarizing the various purposes and advantages of the above described invention, the following items should be noted:

(a) This type of craft, as illustrated, or as modified, to meet requirements, could be advantageously used as a troop landing craft.

(b) Because of its speed and maneuverability, it would be adaptable for submarine warfare.

(c) It could be advantageously used for certain types of rescue work, in the open sea, as well as on the ocean beaches. Likewise, for exploration in such places as the Everglades of Florida, and, being an amphibious craft, it could travel on the desert sands, if the occasion arises.

(d) It is believed that water craft of this kind, designed for riding on the surface and driving on top of the water, will require far less power for propulsion, per ton mile, than any present-day conventional engine and costs of operation are less.

(e) It is anticipated that the pontoons of craft of this invention may be of a wide range of diameters, from that previously mentioned for small craft up to larger size in a range of from 50 to 100 feet in diameter, depend on requirements and specific uses.

(f) The use of the wheel-like rudders 17 with sharpened encircling rims serve effectively for steering the craft both on the water or on land.

I claim:

1. An amphibious craft of the character described comprising a horizontal frame structure including laterally spaced opposite side beams, a frame supporting shaft mounted by said side beams across the forward end portions thereof with its ends extended beyond the corresponding side beams, paired flotation and propelling wheel-like pontoons mounted for rotation on the opposite end portions of said cross-shaft, power means mounted by said frame with connections for rotatably driving said pontoons for craft propulsion, an elevator mounted across the trailing end portion of said frame structure and a pair of flotation and steering wheels mounted by said frame in transverse alignment at its trailing end and means for controlling said wheels for steering the direction of travel of the craft.

2. The water craft of claim 1, wherein an aileron is applied to the trailing edge of said elevator to control its planing action and wherein each of said buoyant wheels, at its trailing end, is mounted by a rudder post which, at its upper end mounts an air rudder that acts in conjunction with the corresponding wheel to supplement its steering action.

3. An amphibious craft of the character described comprising a horizontal frame structure with co-extensive laterally spaced, rearwardly diverging opposite side beams joined in relatively close relationship at their forward ends and in substantially greater spacing at their rearward ends, a supporting shaft mounted by said frame structure across its forward end portion with its opposite end portions extending to opposite sides of said frame structure, a pair of buoyant craft supporting and propulsion wheels rotatably mounted on the extending end portions of said cross-shaft, a power means mounted on said frame structure having driving connections with said buoyant propulsion wheels, buoyant wheels mounted by the trailing end portion of said frame structure with controls for steering the craft in travel, an elevator extending between the side beams at the trailing end of said frame structure, and stabilizers mounted at the opposite ends of said elevator operable with the buoyant steering wheels.

4. A craft of the character described comprising a horizontal frame structure with laterally spaced opposite side beams, a buoyant propelling and supporting wheel, rotatably mounted at the forward end portion of the said frame structure between said beams and in its central longitudinal line, laterally spaced, buoyant supporting wheels at the rear end of said frame structure, operable for steering of the craft in its travel, and power means for rotatably driving said supporting and propulsion wheel.

5. A craft according to claim 4 wherein the rear end steering wheels are formed with encircling rim portions, with opposite side faces converging to substantially sharp edges.

References Cited in the file of this patent
UNITED STATES PATENTS

| | | |
|---|---|---|
| 919,829 | Cummings | Apr. 27, 1909 |
| 2,309,875 | Thompson | Feb. 2, 1943 |
| 2,606,519 | Branco | Aug. 12, 1952 |
| 2,979,016 | Rossi | Apr. 11, 1961 |